May 10, 1938.  A. J. SUBIRA  2,116,736
ADJUSTABLE SUN HAT
Filed Nov. 30, 1936  2 Sheets-Sheet 1
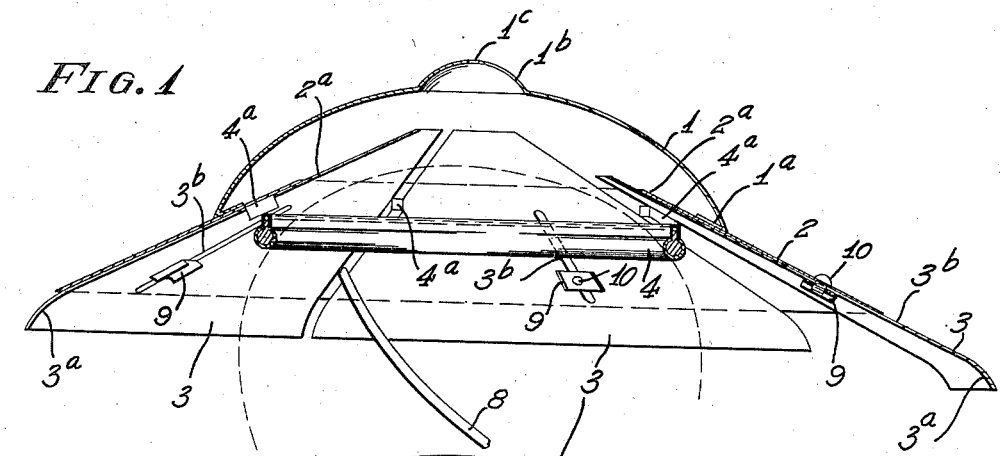
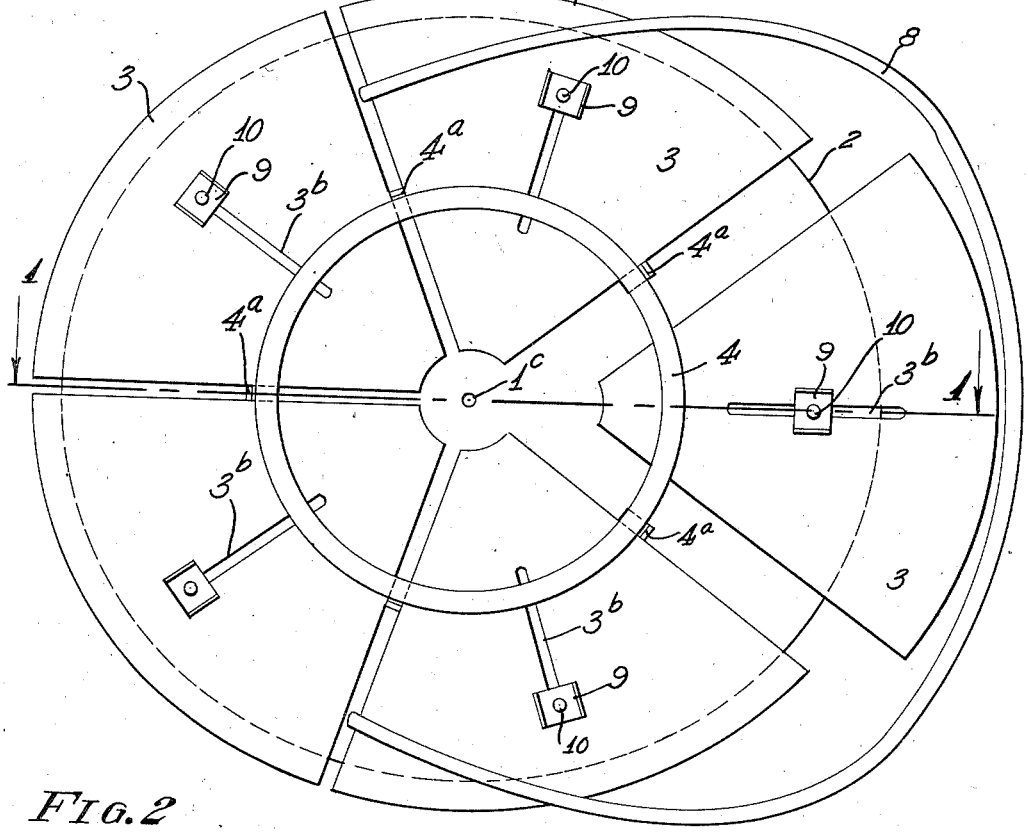
INVENTOR.
BY Anthony J. Subira
A. B. Bowman
ATTORNEY.

May 10, 1938.　　　A. J. SUBIRA　　　2,116,736
ADJUSTABLE SUN HAT
Filed Nov. 30, 1936　　　2 Sheets-Sheet 2
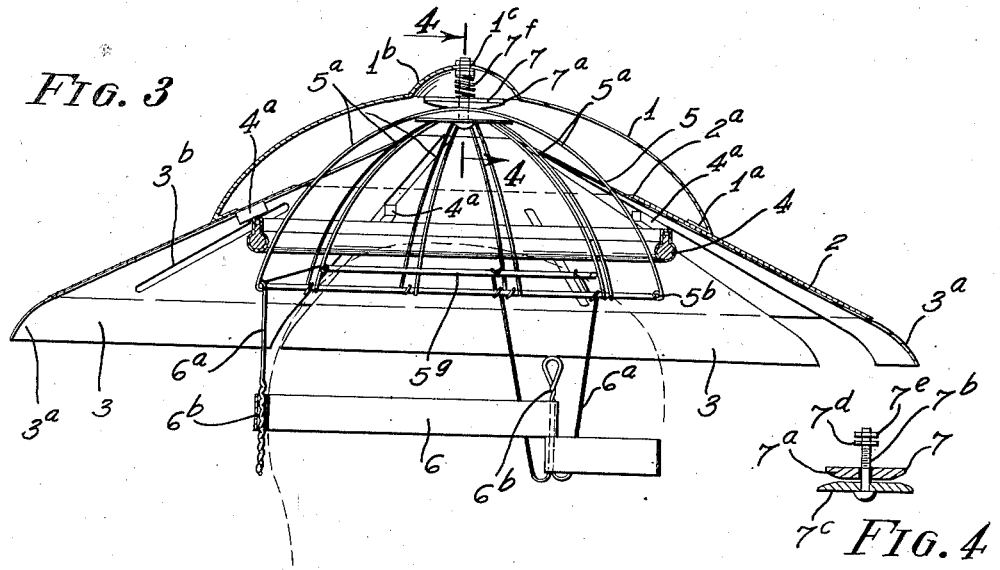
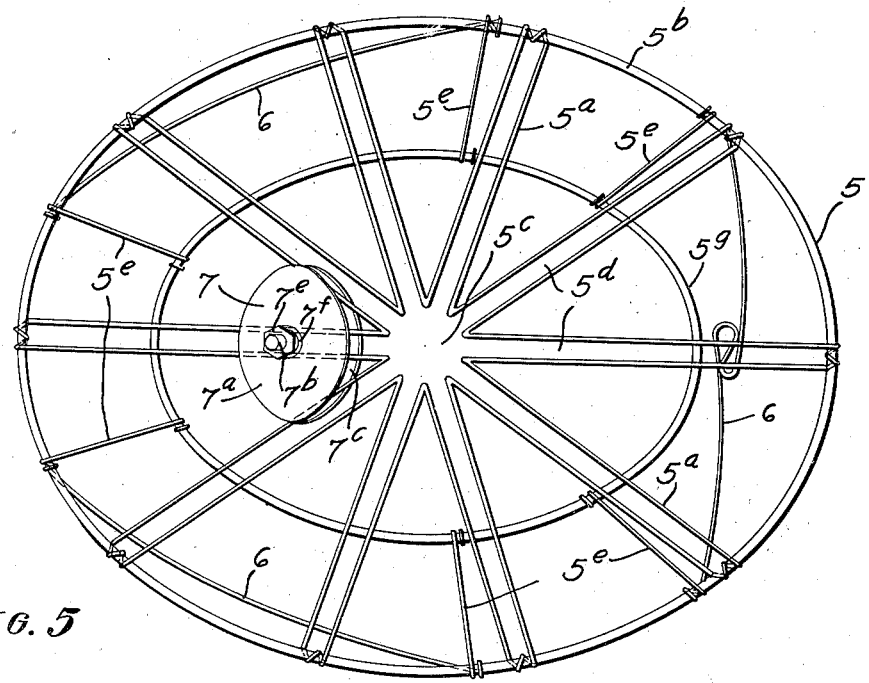
INVENTOR.
Anthony J. Subira
BY A. B. Bowman
ATTORNEY.

Patented May 10, 1938

2,116,736

UNITED STATES PATENT OFFICE 2,116,736

ADJUSTABLE SUN HAT

Anthony J. Subira, Los Angeles, Calif.

Application November 30, 1936, Serial No. 113,305

9 Claims. (Cl. 2—191)

My invention relates to sun hats that are adjustable and the objects of my invention are:

1. To provide a hat which serves as a shade from the sun in which portions are shiftable to provide a larger shade area on the sunny side but permitting a maximum air circulation;

2. To provide a hat of this class which is supported on the head of the wearer and the shade portion of which may be tilted to varying positions for shade purposes;

3. To provide a sun hat of this class, a portion of the shade of which is transparent with some color therein;

4. To provide a sun hat of this class which may be varied in the size of the shade area as desired;

5. To provide a sun hat of this class with means for holding it on the head of the wearer so that it is not easily displaced by wind;

6. To provide a sun hat of this class which may be readily tilted to various positions or the shade portion enlarged or decreased by the wearer while it remains on his head;

7. To provide a sun hat of this class in which the various portions maintain their various tilted and adjusted positions after they are adjusted;

8. To provide a sun hat of this class which is light and comfortable on the head of the wearer;

9. To provide a sun hat of this class in which the eyes may be shaded and at the same time the back of the neck may be protected from the sun;

10. To provide a sun hat of this class which provides clear vision for the wearer; and 11. To provide a sun hat of this class which is very efficient as a sun shade and air circulating medium.

With these and other objects in view as will appear hereinafter, my invention consists of certain novel features of construction, combination, and arrangement of parts and portions as will be hereinafter described in detail and particularly set forth in the appended claims, reference being had to the accompanying drawings and to the characters of reference thereon which form a part of this application in which:

Figure 1 is a sectional view of the hat in its simpler form from the line 1—1 of Fig. 2 shown however in upsidedown position showing the position of the head of the wearer by dotted lines and showing the front side members in extended position; Fig. 2 is a bottom view of the sun hat with the front shade member extended as shown in Fig. 1; Fig. 3 is a sectional view of the hat as shown in Fig. 1 except that it shows a tilting support for the hat as a modification; Fig. 4 is a sectional view from the line 4—4 of Fig. 3 and Fig. 5 is a top or plan view on an enlarged scale of the tilting support as shown in Fig. 3 of the drawings.

Similar characters of reference refer to similar parts and portions throughout the several views of the drawings:

The crown member 1, shade support 2, shade members 3, head pad 4, tilting support 5, tilting support head frame 6, tilting clamp 7, chin band 8, shade clamp 9 and shade clamp bolts 10 constitute the principal parts and portions of my adjustable sun hat.

The crown member 1 is a substantially oblong concavo-convex member provided with an inwardly extending flange portion 1a adapted for securing it to the shade support 2 which is an angular member provided with a central opening 2a and its outer edge extends downwardly in angular form past the member 1 some distance forming a support for said member. Centrally in the crown member 1 is a small raised portion 1b which is provided with a central hole 1c therein. Shiftably mounted on the lower side of the member 2 are a plurality of shade members 3, each of which is adapted to be shifted inwardly and outwardly on the under side of said member 2. Each of these shade members is preferably made of transparent colored material and the outer extended edge is curved downwardly at 3a as shown best in Fig. 1 of the drawings. Each of these members 3 is also provided with a slot 3b through which passes a bolt 10 which is secured in the member 2 and screwed on the end of this bolt 10 is a clamp member 9 which is threaded for receiving the end of the bolt 10 and the member 9 rests against the under side of the shade 3 on opposite sides of the slot 3b and forms a friction support for the shade and permits its being shifted into extended position as shown at the front portion of the hat in Figs. 1 and 2 of the drawings or may be shifted inwardly as shown at the sides and back portion in Figs. 1 and 2 of the drawings.

It will be here noted that there is spring enough in the material that the shade is made of with its relation with the support 2 to provide ample friction for holding the shade member 3 in various extended positions as desired.

Mounted on the under side of the support 2 are a plurality of cushion members 4a which are interposed between each two adjacent shade members 3 and extend past the inner surface of said shade members and secured on these cushion members 4a is the head pad 4 which is preferably a resilient pad member. This head pad 4 serves for engagement of the hat with the head as shown in Fig. 1 of the drawings, the head being shown by dotted line position.

Secured to the support 2 is a chin band 8 interposed between adjacent shade members 3 which is resilient and adapted to be drawn down under the chin of the wearer for holding the hat in position on the head with the member 4 in engagement with the head as shown in Fig. 1 of the drawings.

The above description is description of the hat in its simpler form. However, applicant has provided a means for supporting the hat in relation to the head in adjusted tilted positions in which is utilized a tilting support 5 which includes a spring wire member 5a which is wound around an oblong spring wire member 5b which is preferably oblong in shape as shown best in Fig. 5 of the drawings, and the wire member 5a extends inwardly leaving a circular opening 5c with a plurality of spaces 5d between the wires, all as shown best in Fig. 5 of the drawings. Mounted on the upper side of the wire member 5a is a clamp member 7a, which is pivotally supported on a bolt 7b which also supports another clamp member 7c which is adapted to rest on the lower side of the wire 5a. This bolt 7b is provided with clamp nuts 7d and 7e which are adapted to be clamped on the opposite sides of the member 7b and the bolt supported in the hole 7c in the member 7b. Interposed between the nut 7d and the member 7a is a spring 7f shown in Fig. 3 of the drawings, which tends to hold the members 7a and 7c in close relation to each other with the wire 5a between said members. This provides means for shifting the sun hat shade portion including the members 7 and 7b, support 2, and shades 3 so that they may be tilted relatively to the wire member 5, the bolt entering into all the spaces 5d in the wire 5 and shifted to varying positions therein for tilting the hat sidewise or endwise as desired. This member 5 is supported by means of the wire 5b with braces 5e which support another wire member 5g. These members 5g and 5b are supported by downwardly extending brace wires 6a which are provided with upwardly extending twisted loop portions 6b to which are secured resilient bands 6 which are adapted to be stretched over the head of the wearer as shown by the dotted line position of the head in Fig. 3 of the drawings. With this tilting support 5 used in connection with the hat, it will be noted that the head band 4 is elevated slightly above the head and does not engage the head.

The operation of my adjustable sun hat is as follows: In the simple form as shown in Figs. 1 and 2 of the drawings, the hat is placed on the head of the wearer as shown in Fig. 1 of the drawings with the band 4 in engagement with the head and the chin band 8 drawn down under the chin. If the sun is coming from the front, the front shade member 3 may be drawn forwardly in the position shown in Fig. 1 of the drawings, or this shade member and the two adjacent members may be extended to shut out the sun at the front portion of the hat, and these members 3 may be extended downwardly far enough so that the wearer may see through the transparent curved portion 3a of the shades 3 if desired. If, however, the sun is directed from the back, the back member 3 may be extended and the front portions may be shifted inwardly or if desired all of the members 3 may be extended or they may all be shifted inwardly to suit the direction of the sun's ray toward the wearer.

To the construction shown in Figs. 4 and 5 is added a means for tilting the hat with the shades so that the hat rests on the head by means of the supporting band 6 and in addition to the hereinbefore described means for shifting the sun shades, the hat itself may be tilted relatively to its head support by shifting the clamp member 7 into various positions in the spaces 5d, thus the hat may be tilted to either side or the front or back may be tilted upwardly or downwardly or at various angles between the front and sides.

It will be here noted that the material of this hat may be made of water-proof material and used as a rain hat as well as a sun hat.

Though I have shown and described a particular construction, combination, and arrangement and certain modifications, I do not wish to be limited to this particular construction, combination, and arrangement nor to the modification but desire to include in the scope of my invention the construction, combination and arrangement substantially as set forth in the appended claims.

Having thus described my invention, what I claim as new and desire to secure by Letters Patent is:

1. In an adjustable sun hat, a shade support, means for supporting it on the head of the wearer, a plurality of extendible shades shiftably and adjustably mounted on said support surrounding said shade support, said shades provided with transparent material, and friction clamp and slot means for holding said shade in certain relation with the support.

2. In an adjustable sun hat, a resilient band adapted to be stretched over the head of the wearer, a wire support thereby provided with a plurality of radiating spaces, and a clamp member shiftably mounted radially in said spaces.

3. In an adjustable sun hat, a resilient band adapted to be stretched over the head of the wearer, a wire support thereby provided with a plurality of radiating spaces, a clamp member shiftably mounted radially in said spaces, and a hat shade secured to said clamp member and tiltable thereby with the shifting of said clamp member.

4. In an adjustable sun hat, a resilient band adapted to be stretched over the head of the wearer, a wire support thereby provided with a plurality of radiating spaces, a clamp member shiftably mounted radially in said spaces, a hat shade secured to said clamp member and tiltable thereby with the shifting of said clamp member, said hat shade being shiftable relatively to its support to provide extended shade members.

5. In an adjustable sun hat, a resilient band adapted to be stretched over the head of the wearer, a wire support thereby provided with a plurality of radiating spaces, a clamp member shiftably mounted radially in said spaces, a hat shade secured to said clamp member and tiltable thereby with the shifting of said clamp member, said hat shade being shiftable relatively to its support to provide extended shade members, said clamp member including spring supported clamp members.

6. In an adjustable sun hat, a resilient band adapted to be stretched over the head of the wearer, a wire support thereby provided with a plurality of radiating spaces, a clamp member shiftably mounted radially in said spaces, a hat shade secured to said clamp member and tiltable thereby with the shifting of said clamp member, said hat shade being shiftable relatively to its support to provide extended shade members, said clamp member including spring supported clamp members, a crown member in connection with said clamp member.

7. In an adjustable sun hat, a resilient band adapted to be stretched over the head of the wearer, a wire support thereby provided with a plurality of radiating spaces, a clamp member shiftably mounted radially in said spaces, a hat shade secured to said clamp member and tiltable thereby with the shifting of said clamp member, said hat shade being shiftable relatively to its support to provide extended shade members, said clamp member including spring supported clamp members, a crown member in connection with said clamp member, a support secured to said crown member.

8. In an adjustable sun hat, a resilient band adapted to be stretched over the head of the wearer, a wire support thereby provided with a plurality of radiating spaces, a clamp member shiftably mounted radially in said spaces, a hat shade secured to said clamp member and tiltable thereby with the shifting of said clamp member, said hat shade being shiftable relatively to its support to provide extended shade members, said clamp member including spring supported clamp members, a crown member in connection with said clamp member, a support secured to said crown member, and said members adjustably mounted on said support and shiftable thereon.

9. In an adjustable sun hat, a resilient band adapted to be stretched over the head of the wearer, a wire support thereby provided with a plurality of radiating spaces, a clamp member shiftably mounted radially in said spaces, a hat shade secured to said clamp member and tiltable thereby with the shifting of said clamp member, said hat shade being shiftable relatively to its support to provide extended shade members, said clamp member including spring supported clamp members, a crown member in connection with said clamp member, a support secured to said crown member, said members adjustably mounted on said support and shiftable thereon, and means for frictionally holding said shades in certain relative positions to said support.

ANTHONY J. SUBIRA.